(12) United States Patent
Hardin

(10) Patent No.: US 7,108,244 B2
(45) Date of Patent: Sep. 19, 2006

(54) HIGH-STABILITY VALVE ARRANGEMENT FOR A GOVERNOR VALVE

(75) Inventor: James R. Hardin, North Huntingdon, PA (US)

(73) Assignee: Elliott Turbomachinery Co., Inc., Jeannette, PA (US)

( * ) Notice: Subject to any disclaimer, the term of this patent is extended or adjusted under 35 U.S.C. 154(b) by 259 days.

(21) Appl. No.: 10/415,359

(22) PCT Filed: Oct. 30, 2001

(86) PCT No.: PCT/US01/48091

§ 371 (c)(1),
(2), (4) Date: Oct. 9, 2003

(87) PCT Pub. No.: WO02/36999

PCT Pub. Date: May 10, 2002

(65) Prior Publication Data

US 2004/0051072 A1 Mar. 18, 2004

(51) Int. Cl.
*F16K 1/12* (2006.01)
(52) U.S. Cl. ...................... 251/333; 251/120
(58) Field of Classification Search ........ 251/120–122, 251/318, 333
See application file for complete search history.

(56) References Cited

U.S. PATENT DOCUMENTS

| 1,630,973 A | 5/1927 | Schmidt |
| 2,659,388 A | 11/1953 | Rand |
| 2,786,485 A | 3/1957 | Steirly |
| 2,827,076 A | 3/1958 | Obermaier |
| 2,928,646 A | 3/1960 | Ashbrook |
| 3,695,290 A | 10/1972 | Evans |
| 3,802,660 A | 4/1974 | Flectcher et al. |
| 3,857,542 A | 12/1974 | Heymann |
| 4,607,822 A | 8/1986 | Schabert et al. |
| 4,688,755 A | 8/1987 | Pluviose |
| 4,735,224 A | 4/1988 | Pluviose |
| 4,967,998 A | 11/1990 | Donahue |
| 5,044,604 A | 9/1991 | Topham et al. |

(Continued)

FOREIGN PATENT DOCUMENTS

DE 30 18 093 11/1981

(Continued)

OTHER PUBLICATIONS

Pluviose, M., Stabilization of Flow Through Steam-Turbine Control Valves, Transactions of the ASME, Oct. 1989, pp. 642-646, vol. 111, presented at the Joint ASME/IEEE Power Generation Conference, Portland, Oregon, Oct. 19-23, 1986.

*Primary Examiner*—J. Casimer Jacyne
(74) *Attorney, Agent, or Firm*—The Webb Law Firm

(57) ABSTRACT

A valve arrangement (10) for reducing the instability of fluid flow in a compressible flow governor valve includes a cutoff plug (12) with a lateral concave surface (14) and an end portion (16) having a substantially circular cross section, and a seat (30) with a convex surface (32). The lateral concave surface (14) and the end portion (16) of the cutoff plug (12) define an abrupt cutoff corner (18). The radius (re) of the end portion (16) of the cutoff plug (12) is less than the radius (Rs) of the seat (30). The radius of curvature (R) of the seat (30) is less than the radius of curvature (rq) of the lateral concave surface (14) of the cutoff plug (12). The configuration of the cutoff plug (12) and seat (30) enhances the annular flow pattern beneath the cutoff plug (12) at all lift positions thus reducing flow instability.

21 Claims, 2 Drawing Sheets

U.S. PATENT DOCUMENTS

| | | |
|---|---|---|
| 5,312,085 A | 5/1994 | Yokoyama et al. |
| 5,318,270 A | 6/1994 | Detanne et al. |
| 5,445,194 A * | 8/1995 | Clusserath .................. 141/39 |
| 5,497,801 A | 3/1996 | Kusunose et al. |
| 5,639,062 A | 6/1997 | Irgens et al. |

FOREIGN PATENT DOCUMENTS

| | | |
|---|---|---|
| EP | 0 931 760 | 7/1999 |
| GB | 1 223 983 | 3/1969 |

* cited by examiner

ANNULAR FLOW

CORE FLOW

LOW LIFT

HIGH LIFT

LOW LIFT

HIGH LIFT

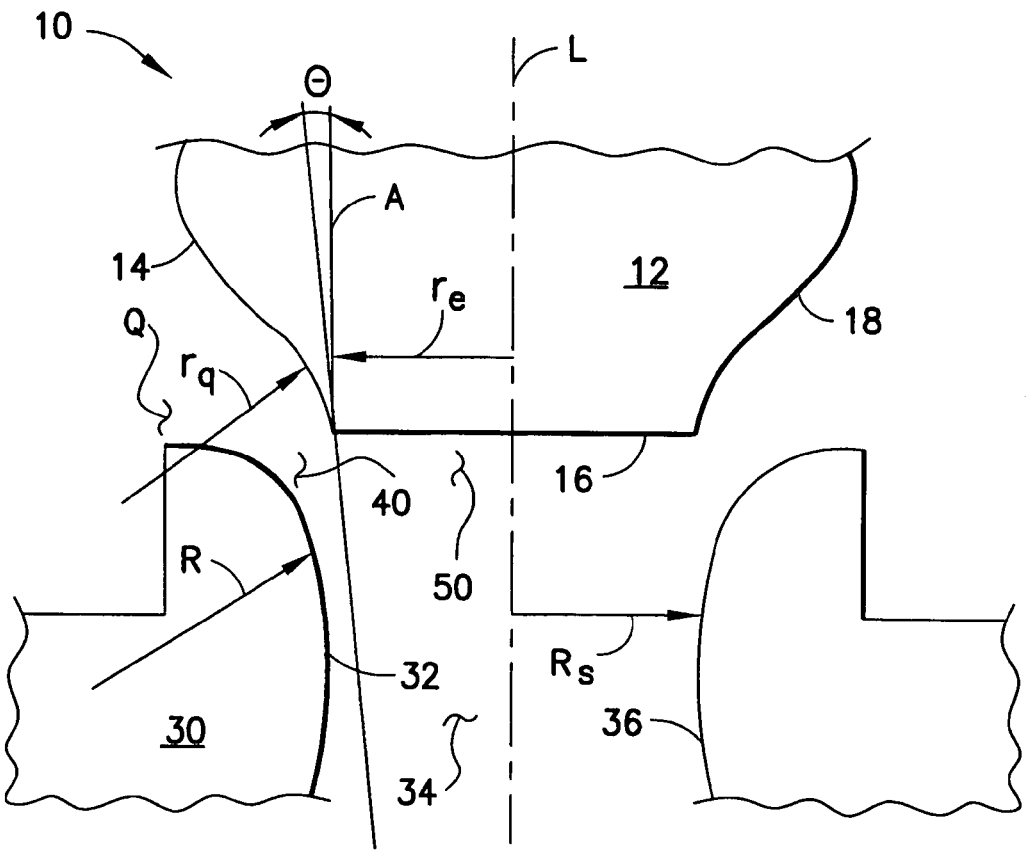
FIG.4
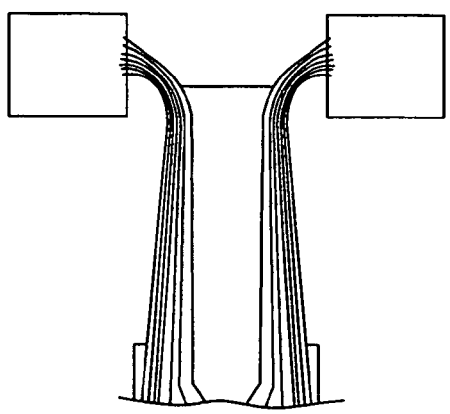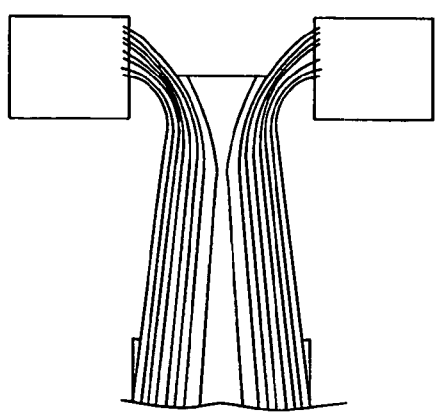
LOW LIFT  　　　　　　　HIGH LIFT
FIG.5A　　　　　　　FIG.5B

HIGH-STABILITY VALVE ARRANGEMENT FOR A GOVERNOR VALVE

BACKGROUND OF THE INVENTION

1. Field of the Invention

The present invention relates to the control of the flow of fluid in valves and, more particularly, to a valve arrangement offering stability over a range of fluid flow rates.

2. Description of the Prior Art

Governor valves are known for use in controlling the operating pressure in fluid systems, such as steam turbine systems. In a steam turbine system, the inlet port of the steam turbine is connected to the outlet port of a governor valve that regulates or controls the fluid flow entering the steam turbine.

It is known in the art that steam turbine governor valves often encounter flow instabilities at some operating positions (i.e., lifts) which can cause noise, excessive vibration, and, possibly, valve failure. Steam turbine governor valves typically employ a cutoff plug that engages a valve seat to regulate the steam flow. The valve seat typically resembles a portion of a toroid. The cutoff plug in operation moves along the valve central axis of the toroid to block or allow fluid movement through the toroidal opening. The seat throat is the most constricted part of this opening.

Flow induced instability is believed to be the most likely cause of catastrophic failures in steam turbine governor valves known in the prior art. Steady state forces are inadequate to explain the damage observed in practice in the prior art. Fracture analysis indicates the occurrence of cyclic loading, which indicates the presence of a time-varying force; and frequency analysis shows no likely simple resonances.

Flow patterns through valves vary with valve design and flow volume, FIGS. 1A and 1B illustrate the differences between annular flow and core flow patterns. In the desirable annular flow pattern there is no impingement of the jet flow in the center of the valve outlet. Instead, an annulus or flow ring is produced wherein upward flow is produced in the center of the valve outlet beneath the plug, and downward flow is restricted to the interior walls of the valve outlet thereby "adhering" or "attaching" to the walls. In the undesirable core flow pattern, the resulting sheet of jet flow impinging on itself is unstable, producing a shifting pattern beneath the plug. The rotating bending predicted to result from shifting jet impingement is consistent with valve stem fracture analysis.

FIGS. 2A and 2B and 3A and 3B contain plots from computational fluid dynamics (CFD) analyses of two prior art plug designs. Flow is downward in the plots. Streaklines show the pattern of flow downstream from each plug. The region in the center of each plot is the reverse flow region that occurs with annular flow.

Referring to FIGS. 2A and 2B, cutoff plugs in which the plug surface cuts away abruptly (i.e., has a sharp cutoff corner) are known to work well at low lift positions. The cutoff corner is located at the tip of the cutoff plug and may generally be defined as the angle formed between the sidewall and the bottom of the cutoff plug. The flow separates from the plug at the cutoff corner and follows the seat wall in an annular form. However, at high lifts (i.e., high flow rate) the opening between the cutoff plug and the seat wall is large compared to the seat radius of curvature. Under these conditions, the seat is unable to guide the flow downward in an annular form with the flow remaining attached to the seat wall. A sheet of unstable flow from the seat wall to the center of the toroid opening beneath the cutoff plug results. This flow pattern is unstable and produces turbulence in the fluid flow volume beneath the cutoff plug.

U.S. Pat. No. 5,312,085 to Yokoyama et al. depicts a typical control valve incorporating a plug with a sharp cutoff corner. As the Yokoyama et al. valve is opened, the location of the plug-seat throat changes. The plug-seat throat is the location at which the cross section of the flow path is at a minimum. The plug-seat throat is therefore the narrowest opening between the plug and the seat. The shutoff valve on which the plug is mounted abuts a valve seat at a contact point. As the plug lifts, the plug-seat throat shifts from the contact point high on the plug and seat to a sharp corner located near the narrowest opening of the seat, but of a smaller diameter than the seat so the sharp corner can never contact the seat. The plug-seat throat remains at the sharp corner as the valve opens more fully. This controlling sharp corner is located on the end of a flange that is of larger diameter than the shaft it is mounted in. This causes the flow passage at low lifts to be narrow at the sharp corner, widen quickly, and then become narrow again near the contact point. This feature causes the high pressure drop experienced at low lifts to be taken in two stages and prevents cavitation because this valve is intended for liquid service rather than for steam.

A flowpath that has two throats (i.e., two narrow constrictions in series) is a critical feature of the Yokoyama et al. valve, but is inadvisable in a valve designed to control the flow of steam. Steam is a compressible fluid and a flowpath incorporating two throats in series is a well known source of flow instability in compressible flow. Additionally, the Yokoyama et al. valve does not resolve instability problems in steam turbine governor valves resulting from the flow impinging on itself beneath the plug. The direction of flow in steam turbine governor valves is from the plug-seat contact point to the narrowest opening of the seat. The direction of flow in the Yokoyama et al. valve is from the narrowest opening of the seat to the plug-seat contact point. The volume in the Yokoyama et al. valve analogous to the volume under the plug in a steam turbine governor valve is occupied by a solid shutoff valve so there is no flow in this volume.

Referring to FIGS. 3A and 3B, cutoff plugs can also be shaped to guide the flow downward in an annular form. For example, cutoff plugs with concave flow surfaces are known in the art. This configuration works well at lifts where the bottom of the plug is level with the seat throat or at higher lifts. At these high lifts, the flow separates from the plug at the cutoff corner and follows or "attaches" the seat wall. At lower lifts (i.e., low flow rate), however, the flow follows the plug wall until the cutoff corner, being guided away from the seat wall. The flow still leaves the plug in an annular pattern but shortly thereafter separates from the seat wall, which dissipates the annulus quickly. FIGS. 3A and 3B show, respectively, the small central reverse flow region at low lift and large reverse flow region at high lift that is characteristic of a "concave" cutoff plug. Annular flow patterns tend to be stable producing a uniform force on the plug. Flow patterns in which the flow impinges on itself beneath the plug are chaotic producing forces on the plug that vary rapidly. It is therefore desirable to use a plug and seat configuration in which the flow takes an annular form at all lifts.

U.S. Pat. Nos. 4,688,755 and 4,735,224 to Pluviose depict a control valve incorporating a plug with a somewhat concave flow surface. Though a portion of the lateral surface of the plug is concave, the lateral surface terminates in an extended cylindrical portion forming a right angle with the end or tip of the plug. Because of this terminal cylindrical portion, the throat of the opening between the seat and the plug is not in proximity to the cutoff corner. The cutoff corner is therefore unable to cause the flow to follow or "attach" to the seat wall, and the desirable annular flow pattern is not produced. The control valve disclosed by the Pluviose patents is configured to form two contiguous flow streams having different velocity distributions. This is accomplished by providing a valve seat with six uniformly spaced longitudinal recesses. The longitudinal recesses produce subsonic jets interposed between supersonic jets giving rise to an intense mixing process, stabilization of the jets, reduction of the lengths of the jets and noise attenuation. FIGS. 3A and 3B show, respectively, the small reverse flow region at low lift and large reverse flow region at high lift that is characteristic of a concave plug.

In summary, control valves having sharp cutoff corner plugs are known to work well at low flow—low lift conditions, but do not operate effectively at high flow—high lift conditions. Conversely, control valves having concave cutoff plugs are known to work well at high flow—high lift conditions, but do not operate effectively at low flow—low lift conditions. Accordingly, an object of the present invention is to provide a valve arrangement that operates effectively at both high and low lift operating conditions. It is also an object of the present invention to provide a valve arrangement that reduces instability of fluid flow in control valves that operate at high flow rates and operating pressures. Furthermore, it is a specific object of the present invention to combine advantageous features of cutoff plugs having abruptly cut-away plug surfaces and the advantageous features of cutoff plugs with concave flow surfaces in a single cutoff plug and valve seat arrangement.

SUMMARY OF THE INVENTION

The above objects are accomplished with a high stability valve arrangement for a governor valve made in accordance with the present invention. The valve arrangement includes a cutoff plug having a lateral concave surface of radius of curvature $r_q$. The lateral concave surface tapers to form an end portion having a substantially circular cross section of radius $r_e$. A seat is located opposite the cutoff plug and has a central aperture along a central axis of the valve arrangement. The central aperture is defined at least in part by a convex surface of the seat having radius of curvature R. The central aperture has a throat of radius $R_s$. The cutoff plug is capable of axial displacement along the central axis and relative to the seat for opening and closing the valve arrangement. A cutoff corner of the plug is defined by an intersection of the end portion and the lateral concave surface of the cutoff plug. The radius $r_e$ of the end portion is less than the radius $R_s$ of the throat. The radius of curvature $r_q$ of the concave surface of the cutoff plug is greater than the radius of curvature R of the convex surface of the seat. The cutoff corner defines an angle of at least about 90°.

The ratio $r_e/R_s$ may be in the range of about 0.8 to 1.0, preferably 0.9 to 1.0, and most preferably 0.95 to 1.0. The ratio $R/r_q$ may be in the range of about 0.6 to 1.0, preferably 0.9 to 1.0, and most preferably about 0.95 to 1.0. An angle θ is defined between the lateral concave surface of the cutoff plug and a line extending parallel to the central axis and passing through the cutoff corner. The angle θ maybe in the range of about 0° to 20°, preferably 0° to 10°, and most preferably 0° to 5°.

The present invention is further directed to a method for reduction of fluid flow in a valve arrangement having a cutoff plug and a seat. The method includes the steps of providing a cutoff plug having a lateral concave surface with a radius of curvature $r_q$, and with the lateral concave surface tapering to form an end portion having a substantially circular cross section of radius $r_e$; providing a seat opposite the cutoff plug having a central aperture along a central axis of the valve arrangement, with the central aperture defined at least in part by a convex surface of the seat having radius of curvature R, and with the central aperture having a throat of radius $R_s$, and the seat having a seat wall downstream of the convex surface; and passing a compressible fluid through a plug-seat throat defined between the cutoff plug and the seat such that fluid flow is directed to produce attachment to the seat wall such that an annular flow stream is formed in the seat throat at all operating positions of the valve arrangement. The cutoff plug is capable of axial displacement along the central axis and relative to the seat for opening and closing the valve arrangement, thereby changing operating positions of the valve arrangement. Thus, the valve arrangement is capable of assuming a plurality of operating positions. The method may further comprise the step of configuring the cutoff plug and seat such that fluid flows are directed to produce an attachment to the seat wall such that an annular flow stream is formed in the seat throat at all operating positions of the valve arrangement.

Further details and advantages of the present invention will become apparent from the following detailed description read in conjunction with the drawings.

BRIEF DESCRIPTION OF THE DRAWINGS

FIG. 4 is a section view of a valve arrangement in accordance with the present invention; and FIGS. 5A and 5B are schematic representations of fluid flow patterns at low lift and high lift conditions, respectively, for the valve arrangement of FIG. 4.

DETAILED DESCRIPTION OF THE INVENTION

Figure 1A:
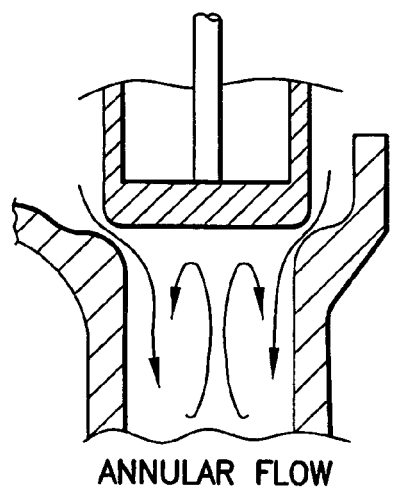
FIGS. 1A and 1B are schematic representations of an annular flow pattern and a core flow pattern, respectively, in a typical prior art valve arrangement having a cutoff plug.
Figure 1B:
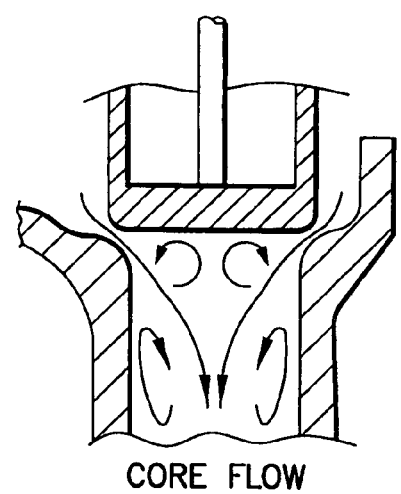
Figure 2A:
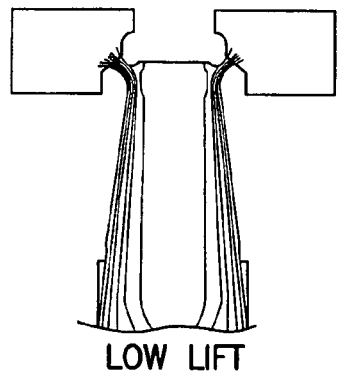
FIGS. 2A and 2B are schematic representations of fluid flow patterns at low lift and high lift conditions, respectively, for a prior art valve arrangement having a cutoff plug with a sharp cutoff surface.
Figure 2B:
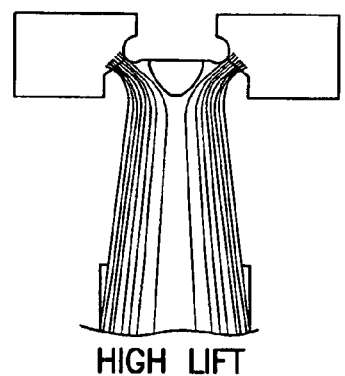
Figure 3A:
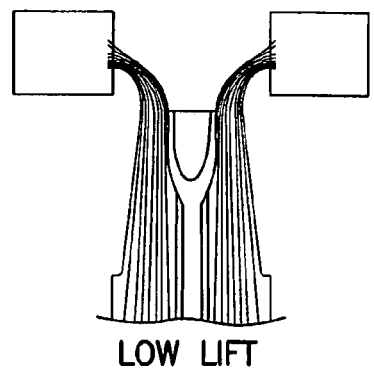
FIGS. 3A and 3B are schematic representations of fluid flow patterns at low lift and high lift conditions, respectively, for a prior art valve arrangement having a concave cutoff plug with a concave cutoff surface.
Figure 3B:
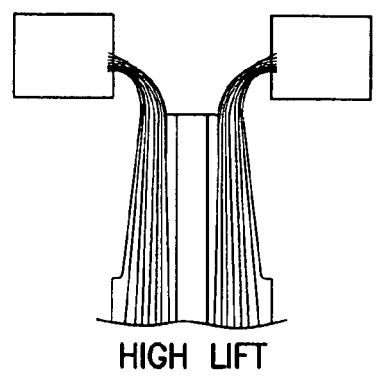

Referring to FIG. 4, the present invention is a valve arrangement 10 that includes a cutoff plug 12 having a lateral concave surface 14 that tapers to form an end portion 16 that is substantially circular in horizontal cross section. The intersection of the end portion 16 and the lateral concave surface 14 of the cutoff plug 12 defines an abrupt cutoff corner 18. The valve arrangement 10 further includes a valve seat 30 with a convex surface 32. The valve seat 30 has a central aperture 34 defined at least in part by the convex surface 32. The upper end of the central aperture 34 faces the cutoff plug 12. Both the central aperture 34 and the cutoff plug 12 are aligned on a valve arrangement central axis L. Fluid passes through the central aperture 34 in the course of operation of the valve arrangement 10. The convex surface 32 is a portion of a seat wall 36 that laterally defines the central aperture 34. The cutoff corner 18 of the cutoff plug 12 and the convex surface 32 of the seat 30 form a plug-seat throat 40 of the valve arrangement 10, as discussed further hereinafter. The seat wall 36 downstream of the convex surface 32 diverges through central aperture 34. The convex surface 32 is disposed circumferentially around a seat throat 50. In operation, the cutoff plug 12 can be moved along the central axis L to assume, in relation to the valve seat 30, various "lifts" open operating positions of the valve arrangement 10.

The valve arrangement 10 of the present invention incorporates features of a cutoff plug with an abrupt cutoff corner, as well as features of a concave plug to more strongly encourage annular flow at high lift and low lift operating pressures. The annular flow features from the concave plug interact with the "abrupt" cutoff plug features in the valve arrangement 10 of the present invention to improve performance at both high and low lift conditions. Annular flow performance of the valve arrangement 10 of the present invention exceeds that of prior art concave plugs at low lift conditions and exceeds annular performance of abrupt cutoff plugs at high lift conditions.

Radius $r_e$ of the plug end surface 16 is measured from the central axis L to the cutoff corner 18. Radius $r_e$ of the plug end surface 16 is slightly less than radius $R_S$ of the seat throat 50, which encourages annular flow while avoiding contact between the abrupt cutoff corner 18 and the seat 30, and further causes the plug-seat throat 40 to undergo a rapid transition to the corner 18 of the plug 12 as the plug 12 lifts from the closed position. The ratio of $r_e$ to $R_S$ (i.e., $r_e/R_S$) is in the range of about 0.8 to about 1.0, preferably about 0.9 to about 1.0, and most preferably from about 0.95 to about 1.0.

At very low lifts, the plug-seat throat 40 of the valve arrangement 10 is located above the abrupt cutoff corner 18 of the plug 12. However, a radius of curvature $r_q$ of the lateral concave surface 14 of the plug 12 and a radius of curvature R of the convex surface 32 of the seat 30 ensure that the flow will follow the seat wall 36. As the lift is increased, the plug-seat throat 40 moves very quickly downward toward the abrupt cutoff corner 18 of the plug 12 so that for any lift positions other than very low lifts the plug-seat throat 40 remains located at the abrupt cutoff corner 18 of the plug 12. In particular, the abrupt cutoff corner 18 of the plug 12 remains adjacent the convex surface 32 of the seat 30 throughout the various operating lift positions of the valve arrangement 10. As a result, the exit angle from the plug 12 is nearly parallel to the central axis L of the valve arrangement 10. This orientation causes flow momentum that encourages annular flow leaving the plug-seat throat 40 and fluid flow attachment to the diverging seat wall 36 downstream of the convex surface 32 of the seat 30. Annular flow is thereby maintained downstream of the convex surface 32 of the seat 30. Cutoff plugs with abrupt cutoff corners cannot have this feature without causing the abrupt cutoff corner to strike the seat when the valve closes. Concave cutoff plugs have this feature, but the plug geometry does not encourage seat wall attachment of the fluid flow because the cutoff corner is at too small a radius from the valve axis, and the plug-seat throat is not located at this cutoff corner.

The radius of curvature $r_q$ of the concave surface 14 of plug 12 is slightly greater than the radius of curvature R of the convex surface 32 of the seat 30 to avoid double throat at low lift. Double throat is a situation in which there are two throats or constrictions in a fluid passage. If $r_q$ were less than R, there would be a throat near the point at which the plug 12 and the seat 30 were in contact when the valve arrangement 10 was closed, as well as another throat adjacent the cutoff corner 18. The turbulence and flow disruption introduced by a double throat configuration is undesirable. The radius of curvature $r_q$ of the concave surface 14 of the plug 12 is not much larger than the radius of curvature R of the convex surface 32 of seat 30 so that the lift requirements of the plug 12 are minimized. The ratio of R to $r_q$ (i.e., $R/r_q$) is in the range from about 0.6 to about 1.0, preferably about 0.9 to about 1.0, and more preferably from about 0.95 to about 1.0. The center of radius $r_q$ is located no closer to the central axis L than is the center of radius R.

Angle θ between the lateral concave surface 14 and a line A parallel to the central axis L is minimized to encourage annular flow and the attachment of the flow to the seat wall 32 of the seat 30. Line A passes through the cutoff corner 18. However, in most applications angle θ=0° is avoided to improve lift versus area characteristics. As angle θ decreases, the amount of lift needed to achieve any particular flow area increases. As angle θ increases, the ability of the cutoff corner 18 to direct fluid flow decreases. The angle θ is in the range from about 0° to about 20°, preferably from about 0° to about 10°, and could be from about 0° to about 5°.

FIGS. 5A and 5B show, respectively, the large central reverse flow regions at both low lift and high lift that are characteristic of the valve arrangement 10 of the present invention. In the arrangements shown in FIGS. 5A and 5B, upstream pressure is constant and downstream pressure rises with lift.

The valve arrangement 10 of the present invention achieves annular flow throughout the lift range (i.e., at all open operating positions). At all lifts, the flow is directed by the concave surface 14 of the plug 12 until it reaches the cutoff corner 18 of the plug 12 and the cutoff corner 18 produces a separation of the flow from the plug 12. The flow thereafter follows the seat wall 32 in an annular form. Because the exit angle of the flow from the concave surface 14 of the plug 12 is nearly parallel to the valve axis, flow momentum produces an attachment of flow to the seat wall 36, which results in annular flow. The valve arrangement 10 is suitable for use in any type of valve used to regulate compressible fluid and, particularly, steam turbine governor valves.

While the present invention was described with reference to preferred embodiments, various modifications and alterations of the present invention may be made without departing from the spirit and scope of the present invention. The scope of the present invention is defined in the appended claims and equivalents thereto.

I claim:

1. A valve arrangement for compressible fluids, comprising:
   a cutoff plug having a continuous peripheral concave surface of radius of curvature $r_q$ extending directly to a cutoff corner to form an end portion having a substantially circular cross section of radius $r_e$ without an intervening cyclindrical-shaped portion between the peripheral concave surface and the cutoff corner; and
   a seat opposite the cutoff plug having a central aperture along a central axis of the valve arrangement, with the central aperture defined at least in part by a convex surface of the seat having radius of curvature R, and with the central aperture having a throat of radius $R_s$, wherein the cutoff plug is capable of axial displacement along the central axis and relative to the seat for opening and closing the valve arrangement, wherein the cutoff corner of the plug is defined by an intersection of the end portion and the peripheral concave surface of the cutoff plug, wherein $r_e$ is less than $R_s$, wherein $r_q$ is greater than R, and wherein the cutoff corner defines an angle of at least about 90°.

2. The valve arrangement of claim 1, wherein the ratio $r_e/R_s$ is in the range of about 0.8 to 1.0.

3. The valve arrangement of claim 1, wherein the ratio $r_e/R_s$ is in the range of about 0.9 to 1.0.

4. The valve arrangement of claim 1, wherein the ratio $r_e/R_s$ is in the range of about 0.95 to 1.0.

5. The valve arrangement of claim 1, wherein the ratio $R/r_q$ is in the range of about 0.6 to 1.0.

6. The valve arrangement of claim 1, wherein the ratio $R/r_q$ is in the range of about 0.9 to 1.0.

7. The valve arrangement of claim 1, wherein the ratio $R/r_q$ is in the range of about 0.95 to 1.0.

8. The valve arrangement of claim 1, wherein an angle θ between the peripheral lateral concave surface and a line parallel to the central axis and passing through the cutoff corner is in the range of about θ=0° to 20°.

9. The valve arrangement of claim 8, wherein the angle θ is in the range of about θ=0° to 10°.

10. The valve arrangement of claim 8, wherein the angle θ is in the range of about θ=0° to 5°.

11. A method for the reduction of instability of fluid flow in a valve arrangement having a cutoff plug and a seat, comprising the steps of:
    providing a cutoff plug having a continuous peripheral concave surface with a radius of curvature $r_q$ extending directly to a cutoff corner to form an end portion having a substantially circular cross section of radius $r_e$ without an intervening cyclindrical-shaped portion between the peripheral concave surface and the cutoff corner;
    providing a seat opposite the cutoff plug having a central aperture along a central axis of the valve arrangement, with the central aperture defined at least in part by a convex surface of the seat having radius of curvature R, and with the central aperture having a throat having radius $R_s$, and the seat having a seat wall downstream of the convex surface; and
    passing a compressible fluid through a plug-seat throat defined between the cutoff plug and the seat such that fluid flow is directed to produce attachment to the seat wall such that an annular flow stream is formed in the seat throat at all operating positions of the valve arrangement,
    wherein the cutoff plug is capable of axial displacement along the central axis and relative to the seat for opening and closing the valve arrangement, thereby changing operating positions of the valve arrangement,
    wherein the cutoff corner is defined by an intersection of the end portion and the peripheral concave surface of the cutoff plug,
    wherein $r_e$ is less than $R_s$,
    wherein $r_q$ is greater than R, and
    wherein the cutoff corner defines an angle of at least about 90°.

12. The valve arrangement of claim 11, wherein the ratio $r_e/R_s$ is in the range of about 0.8 to 1.0.

13. The valve arrangement of claim 11, wherein the ratio $r_e/R_s$ is in the range of about 0.9 to 1.0.

14. The valve arrangement of claim 11, wherein the ratio $r_e/R_s$ is in the range of about 0.95 to 1.0.

15. The valve arrangement of claim 11, wherein the ratio $R/r_q$ is in the range of about 0.6 to 1.0.

16. The valve arrangement of claim 11, wherein the ratio $R/r_q$ is in the range of about 0.9 to 1.0.

17. The valve arrangement of claim 11, wherein the ratio $R/r_q$ is in the range of about 0.95 to 1.0.

18. The valve arrangement of claim 11, wherein an angle θ between the peripheral concave surface and a line parallel to the central axis and passing through the cutoff corner is in the range of about θ=0° to 20°.

19. The valve arrangement of claim 18, wherein angle θ is in the range of about θ=0° to 10°.

20. The valve arrangement of claim 18, wherein the angle θ is in the range of about θ=0° to 5°.

21. A valve arrangement for compressible fluids, comprising:
    a cutoff plug having a continuous peripheral concave surface of radius of curvature $r_q$ extending directly to a cutoff corner to form an end portion having a substantially circular cross section of radius $r_e$; and
    a seat opposite the cutoff plug having a central aperture along a central axis of the valve arrangement with the central aperture defined at least in part by a convex surface of the seat having radius of curvature R, and with the central aperture having a throat of radius $R_s$, wherein the cutoff plug is capable of axial displacement along the central axis and relative to the seat for opening and closing the valve arrangement,
    wherein the cutoff corner of the plug is defined by an intersection of the end portion and the peripheral concave surface of the cutoff plug,
    wherein $r_e$ is less than $R_s$, wherein $r_q$ is greater than R, and wherein the cutoff corner defines an angle of greater than 90°.

* * * * *

UNITED STATES PATENT AND TRADEMARK OFFICE
CERTIFICATE OF CORRECTION

PATENT NO.       : 7,108,244 B2                                        Page 1 of 1
APPLICATION NO.  : 10/415359
DATED            : September 19, 2006
INVENTOR(S)      : James R. Hardin It is certified that error appears in the above-identified patent and that said Letters Patent is hereby corrected as shown below:

Title Page of the Patent; Insert
--             Related U.S. Application Data
(60) Provisional Application No. 60/245,100, filed on November 1, 2000. --

Signed and Sealed this

Sixth Day of February, 2007

JON W. DUDAS
*Director of the United States Patent and Trademark Office*